United States Patent Office 3,332,873
Patented July 25, 1967

3,332,873
PHOSPHATE ESTER GREASES
Anthony Joseph Saraceno, Devon, Pa., assignor to Pennsalt Chemicals Corporation, Philadelphia, Pa., a corporation of Pennsylvania
No Drawing. Filed Aug. 13, 1965, Ser. No. 479,646
5 Claims. (Cl. 252—32.5)

This invention deals with improved greases and is particularly concerned with greases made from phosphate esters.

Phosphate ester greases are known and are conventionally prepared by adding a thickening agent to the ester. Normally, the amount of thickening agent will require about 15% by weight of the ester or more. It has now been found, however, that excellent greases may be obtained from phosphate esters by incorporating in said ester from about 3 to about 10% by weight of certain inorganic polymers. The greases obtained are particularly desirable in that they have high dropping points, room temperature workability, and excellent resistance towards bleeding.

Polymers which are useful in the invention as additives for the phosphate esters are those described in S.N. 382,924, now U.S. Patent 3,275,574, filed July 15, 1964 by Anthony J. Saraceno. These polymers are characterized by having the repeating units $M(a)(b)X_2$ wherein M is a trivalent octahedral metal, $a$ is a unidentate ligand having a charge of minus one (hydroxyl ion), $b$ is a neutral unidentate ligand (a water molecule), and X is a bridging group also with a charge of minus one. Alternatively, these solid polymers may be represented as compounds containing a plurality of the following recurring units:

wherein M, $a$, $b$ and X are defined above and the repeating units may be the same (homopolymers) or different (copolymers).

The trivalent octahedral metal M may be any of the numerous metals characterized by having a relatively unstable +2 valence which can be oxidized to the stable trivalent oxidation state and has in its trivalent state a coordination number of six (i.e., an octahedral spatial configuration). By a relatively unstable +2 valence state is meant that the metal in its divalent state as its simple salts is capable of being oxidized to its trivalent state by air at ambient temperature and at atmospheric pressure. Such metals will include those metals selected from the group consisting of chromium, iron, ruthenium, europium and ytterbium.

The catenating or bridging group (X in the above formula of the polymers) will have a charge of minus one and will comprise the anion of an acid. Preferably, the acid will be one having the structure $R_2M'(O)OH$ which is based on a group of metals and metalloids of group VB; that is, M' is an element of group VB having an atomic number greater than seven (e.g., phosphorus, arsenic, antimony and bismuth). M' is preferably phosphorus and the preferred bridging groups are the anions of phosphinic acids. Many of these acids are disclosed by Kosolapoff in his book, "Organophosphorus Compounds" (John Wiley, 1950). It is evident that for the purpose of forming the polymer backbone by bridging the octahedral metal M atoms, only three valences of the M' atom in each of the bridging groups are used. Thus the remaining valences of the M' atom are satisfied with the two R groups as shown above in the acid formula $R_2M'(O)OH$. These R groups may be the same or different inert organic groups such as alkyl, aryl, alkoxy or aryloxy radicals. Preferably, R will be a hydrocarbon alkyl or aryl group containing from one to ten carbon atoms such as, for example, methyl, ethyl, t-butyl, hexyl, octyl, phenyl, tolyl, xylyl, naphthyl and the like. It will also be understood that the two bridging groups need not be the same.

As indicated, the unidentate ligand $a$, which will have a charge of minus one, will be a hydroxyl ion and the unidentate ligand $b$ is a neutral water molecule. These unidentate ligands will be bonded to the trivalent octahedral metal and in combination they serve to complete the coordination number of six and to give a polymer which is electrically neutral. These polymers are further described and their preparation given in Inorganic Chemistry 3, 1699 (1964).

The phosphate esters to which the above described inorganic polymer will be added in accordance with the practice of this invention are those having the structure $(R_1O)(R_2O)(R_3O)P=O$, which are well known and find commercial utility as hydraulic fluids. $R_1$, $R_2$ and $R_3$ in the above formula are organic groups. The R groups may be the same or different and they may be alkyl, aryl or alkaryl groups. The R groups may contain from 1 to 18 carbon atoms, but will preferably have from 1 to 10 carbon atoms. Specific examples of phosphate esters described by the above formula which may be used in the invention will include tricresyl phosphate, trioleyl phosphate, tristearyl phosphate, trioctyl phosphate, lauryl dioctyl phosphate, trimethyl phosphate, methyl diphenyl phospate, diethyl phenyl phosphate, dibutyl cresyl phosphate, dibutyl lauryl phosphate, lauryl dicyclohexyl phosphate, dimethyl cyclohexyl phosphate, tricyclohexyl phosphate, cyclohexyl dicresyl phosphate, lauryl diphenyl phosphate, oleyl dicresyl phosphate, triethyl phosphate, trilauryl phosphate, tributyl phosphate, dimethyl cresyl phosphate, diphenyl cresyl phosphate, phenyl dicresyl phosphate, diamyl phenyl phosphate, trinaphthyl phosphate, and the like. Preferably, trialkyl and triaryl phosphates will be employed as these have major commercial importance.

Incorporation of the polymer into the phosphate ester fluid can be done in any standard fashion, but it is preferred to first dissolve the polymer in a solvent such as chloroform and add that solution with rapid stirring to the phosphate ester material, the addition being made under vacuum conditions to remove the solvent in which the inorganic polymer was dissolved. The mixture is then heated to a temperature of about 100° C. and after 1 to 3 hours it sets to a soft grease-like gel. The greases thus obtained are characterized by good workability at room temperature and have excellent lubricating characteristics. The amount of polymer additive may vary anywhere between about 3% and 10% since the effects of grease formation are achieved at this relatively low concentration.

In order to further illustrate the invention, the following examples are given:

Example 1

1.0 g. of $[Cr(H_2O)(OH)(OP(C_6H_5)_2O)_2]_x$ was dissolved in 20 ml. of $CHCl_3$. The solution was added to 19.0 g. of tricresyl phosphate with rapid stirring and the $CHCl_3$ removed under vacuum. The mixture was then heated in an oven at 100° C. It set to a soft, grease-like gel in 1–3 hours. The grease thus prepared had an ASTM dropping point (D566–42) of >420° F.

Example 2

Instead of using the above inorganic polymer, a similar grease is obtained by incorporating into ethyl diphenyl phosphate 3% by weight of an inorganic polymer having repeating units $[Cr(H_2O)(OH)(OP(CH_3)(C_6H_5)O)_2]$.

Example 3

The following table illustrates the effect of heating time and concentration of polymer on ASTM Dropping Point. The polymer used in this example is the same as used in Example 1.

TABLE I

| Polymer Conc. (percent) | Heating Time at 240° F. (hrs.) | ASTM Dropping Point (° F.) |
| --- | --- | --- |
| 3 | 48 | 208 |
| 3 | 120 | 318 |
| 3 | 240 | 341.5 |
| 5 | 30 | >420 |

The above greases are characterized by workability at room temperature and lubricating characteristics equivalent to tricresyl phosphate as determined by Falex tests.

In many applications, the temperature limit of a grease is not its decomposition or its point of rapid volatility, but the temperature at which the grease runs or drops. Hence the utility of having thickener imparting high dropping points to a base fluid which is an excellent lubricant is evident. It should further be pointed out that these characteristics are attained at concentrations which are considerably lower than for conventional thickeners, thus providing greases which are superior in lubricating action to other triaryl phosphate greases.

Example 4

Using the technique of Example 1, greases are prepared by incorporating 5% by weight of any of the following polymers in any of the listed phosphate esters:

| Polymer Units | Phosphate Ester |
| --- | --- |
| $[Cr(H_2O)(OH)(OP(C_8H_{19})_2O)_2]$ | Tristearyl phosphate. Trioctyl phosphate. Tributyl phosphate. Lauryl cyclohexyl phosphate. |
| $[Cr(H_2O)(OH)(OP(OC_6H_5)_2O)_2]$ | Triphenyl phosphate. Tris(tetrahydrobeta-naphthyl)phosphate. |
| $[Cr(H_2O)(OH)(OP(OCH_3)(OC_6H_5)O)_2]$ | Methyl dicresyl phosphate. |
| $[Fe(H_2O)(OH)(OP(C_6H_5)_2O)_2]$ | Phenyl diethyl phosphate. |

It will be understood that numerous changes and variations may be made from the above description and examples without departing from the spirit and scope of the invention.

I claim:

1. A grease composition comprising a phosphate ester and a thickening amount of a polymer consisting of a doubly-bridged trivalent octahedral metal coordinated with two unidentate ligands, wherein the bridging group of said polymer is the anion of an acid of structure $R_2M'(O)OH$ where R is selected from the group consisting of alkyl, aryl, alkoxy and aryloxy, M' is a Group VB element having an atomic number greater than seven, and wherein one of said unidentate ligands is a hydroxyl anion and the second unidentate ligand is a water molecule.

2. A grease composition comprising a triaryl phosphate ester containing from about 3 to about 10% by weight of a polymer consisting of a doubly bridged trivalent octahedral metal coordinated with two unidentate ligands, wherein each of said bridging groups is the anion of an acid $R_2P(O)OH$, where R is a member of the group consisting of hydrocarbon alkyl and aryl radicals containing from 1 to 10 carbon atoms, wherein one of said unidentate ligands is a hydroxyl ion and the second unidentate ligand is a water molecule.

3. A grease composition comprising tricresyl phosphate and from about 3 to about 10% by weight of a polymer consisting of a doubly bridged chromium atom coordinated with water and a hydroxyl group, said bridging group consisting of the anions of diphenyl phosphinic acid.

4. A grease composition comprising tricresyl phosphate and from about 3 to about 10% by weight of a polymer consisting of a doubly bridged chromium atom coordinated with water and a hydroxyl group, said bridging group consisting of the anions of phenyl methyl phosphinic acid.

5. A grease composition comprising a triaryl phosphate ester containing from about 3 to about 10% by weight of a polymer consisting of a doubly bridged chromium atom coordinated with water and a hydroxyl group, said bridging group consisting of the anions of an acid of structure $R_1R_2P(O)OH$ where $R_1$ is alkyl containing one to 10 carbon atoms and $R_2$ is aryl containing 6 to 10 carbon atoms.

References Cited

UNITED STATES PATENTS

| 2,976,238 | 3/1961 | Elliott et al. | 252—32.5 |
| 3,197,436 | 7/1965 | Block et al. | 260—2 |

DANIEL E. WYMAN, *Primary Examiner.*

I. VAUGHN, *Assistant Examiner.*